United States Patent
Lim et al.

(10) Patent No.: US 7,601,443 B2
(45) Date of Patent: Oct. 13, 2009

(54) PERPENDICULAR MAGNETIC RECORDING MEDIA WITH LAMINATED SOFT MAGNETIC UNDERLAYER

(75) Inventors: Chee-kheng Lim, Suwon-si (KR); Yong-su Kim, Seoul (KR); Byung-kyu Lee, Seoul (KR); Hoon-sang Oh, Seongnam-si (KR); Tae-hyo Lee, Cheonan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 567 days.

(21) Appl. No.: 11/259,085

(22) Filed: Oct. 27, 2005

(65) Prior Publication Data

US 2006/0093865 A1 May 4, 2006

(30) Foreign Application Priority Data

Oct. 28, 2004 (KR) .................. 10-2004-0086537

(51) Int. Cl.
*G11B 5/66* (2006.01)
*G11B 5/667* (2006.01)
*G11B 5/673* (2006.01)

(52) U.S. Cl. .................... 428/828.1; 428/829
(58) Field of Classification Search ............... None
See application file for complete search history.

(56) References Cited

U.S. PATENT DOCUMENTS 5,942,342 A * 8/1999 Hikosaka et al. ......... 428/832.1
6,890,667 B1 * 5/2005 Lairson et al. ............. 428/611
7,217,467 B2 * 5/2007 Arai et al. ................ 428/828.1
7,378,164 B1 * 5/2008 Lairson et al. ........... 428/828.1
2005/0129985 A1 * 6/2005 Oh et al. ................ 428/694 TS

FOREIGN PATENT DOCUMENTS

| JP | 59-48822 A | 3/1984 |
|---|---|---|
| JP | 2001-155322 A | 6/2000 |
| JP | 2002-230735 | 8/2002 |
| JP | 2002-342909 A | 11/2002 |
| JP | 2004-079403 A | 3/2004 |
| JP | 2004-118894 | 4/2004 |
| JP | 2004-272957 | 9/2004 |

OTHER PUBLICATIONS

Machine Translation of JP 2004-118894 A.*
Machine Translation of JP 2004-272957 A.*

* cited by examiner

*Primary Examiner*—Kevin M. Bernatz
(74) *Attorney, Agent, or Firm*—Sughrue Mion, PLLC

(57) ABSTRACT

A recording medium including a perpendicular magnetic recording layer and a laminated SUL formed on a substrate is provided. The SUL includes an antiferromagnetic layer interposed between laminated structures including a magnetic layer, a non-magnetic layer and a magnetic layer. The layers may each have a thickness of 20 nm or less and the layers below the antiferromagnetic layer may be thinner than the layers on the antiferromagnetic layer. The laminated structures formed on and below the antiferromagnetic layer have unidirectional magnetic anisotropies set in the opposite radial direction to each other by an exchange bias. As a result, media magnetic domain noise can be diminished.

18 Claims, 10 Drawing Sheets

PERPENDICULAR MAGNETIC RECORDING MEDIA WITH LAMINATED SOFT MAGNETIC UNDERLAYER

This application claims priority from Korean Patent Application No. 10-2004-0086537, filed on Oct. 28, 2004, in the Korean Intellectual Property Office, the disclosure of which is incorporated herein in its entirety by reference.

BACKGROUND OF THE INVENTION

1. Field of the Invention

Apparatuses consistent with present invention relate to recording media, and more particularly, to perpendicular magnetic recording media with a laminated soft magnetic underlayer.

2. Description of the Related Art

Recording density of recording media, such as magnetic disk devices, is rapidly being increased. To increase the recording density of the magnetic disk device, a perpendicular magnetic recording method has been proposed. The recording density of the perpendicular magnetic recording media is increased by magnetization of a magnetic recording layer in a perpendicular direction. The recording layer for such a perpendicular magnetization uses a magnetic material that can display relatively high magnetic anisotropy and coercivity.

To help write data on a recording layer by means of effective magnetization of the recording layer, the introduction of a soft magnetic underlayer (SUL) below the recording layer has been proposed. On the recording layer, a head having a trailing pole and a return pole is generally located for perpendicular magnetization of the recording layer. To obtain the same effect as that of an image head, corresponding to the head having the trailing pole and the return pole, located below the recording layer, the SUL has been introduced.

Figure 1:
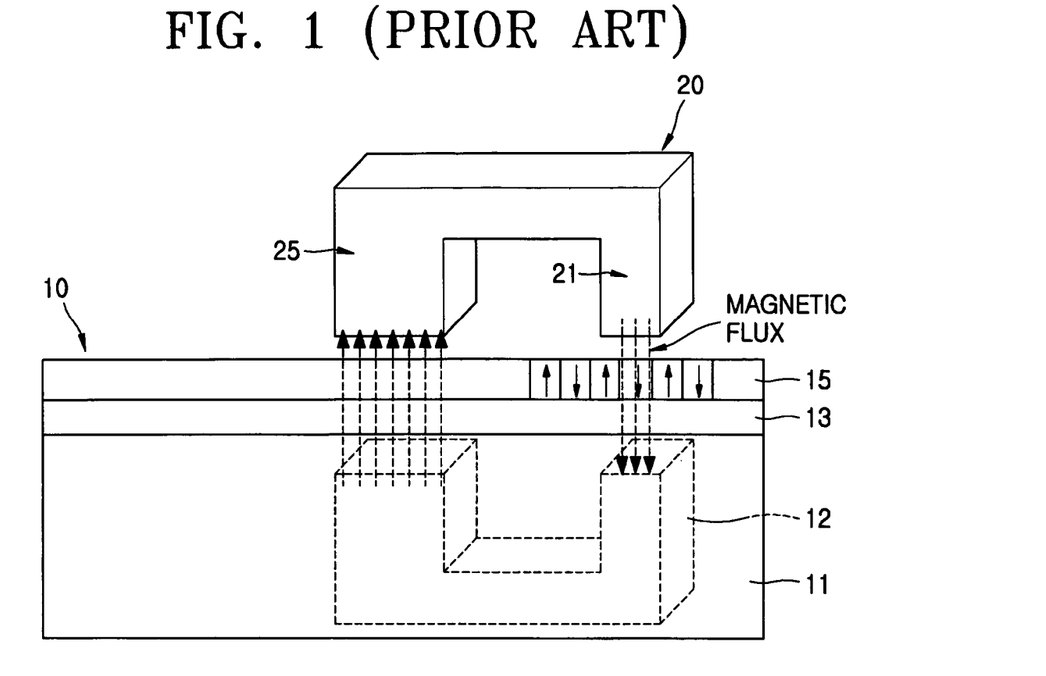
FIG. 1 is a schematic diagram of a typical perpendicular magnetic recording device.

FIG. 1 is a schematic diagram of a typical perpendicular magnetic recording device.

Referring to FIG. 1, a typical perpendicular magnetic recording medium 10 has an SUL 11, an intermediate layer 13 and a recording layer 15 formed sequentially on a substrate (not shown). On the recording layer 15, a protective layer and/or a lubricant layer, etc. may be further formed. The recording layer 15 is magnetized by a head 20 located at a distance, also known as fly height, above the perpendicular magnetic recording medium 10.

A magnetic flux discharged from a trailing pole 21 upon a writing operation magnetizes the recording layer 15 in a bit region unit and runs along the SUL 11, i.e., enters into and runs along an image head 12, and then returns to a return pole 25. Thus, since a density of the magnetic flux discharged from the trailing pole 21 is effectively transferred to the recording layer 15 without fluctuating, the recording layer 15 is more effectively magnetized by such a magnetic flux.

In the case of introducing such an SUL, a saturation of the SUL should first be considered. SUL saturation leads to degradation of the magnetic flux discharged from the trailing pole because the flux cannot penetrate into the SUL. To effectively prevent the saturation of the SUL, the SUL should have a sufficient thickness and have a sufficient saturation magnetization ($M_{S,\,SUL}$). However, a thick SUL can result in serious magnetic domain noise.

Thus, to increase the effect of the introduction of an SUL, studies on forming the SUL in various multilayered structures have been actively performed. In particular, there have been various attempts to prevent spike noise, which accompanies the SUL, or demagnetization due to the movement of a domain wall.

SUMMARY OF THE INVENTION

The present invention provides a perpendicular magnetic recording medium having a soft magnetic underlayer (SUL) with a multilayered structure which can effectively diminish magnetic domain noise while improving a write performance.

According to an exemplary aspect of the present invention, there is provided a perpendicular magnetic recording medium including: a substrate; a perpendicular magnetic recording layer formed on the substrate; and a soft magnetic underlayer (SUL) interposed between the substrate and the perpendicular magnetic recording layer and including an antiferromagnetic layer, a first magnetic layer and a second magnetic layer, respectively, formed on and below the antiferromagnetic layer and having unidirectional magnetic anisotropies in opposite directions to each other by an exchange bias, a first non-magnetic layer formed on either the first magnetic layer or the second magnetic layer and opposite to the antiferromagnetic layer; and a third magnetic layer formed on the first non-magnetic layer and antiferromagnetically bonded to the first magnetic layer to have a uniaxial magnetic anisotropy in the opposite direction to the magnetic anisotropy of the first magnetic layer.

The SUL may further include a second non-magnetic layer interposed between the second magnetic layer and the substrate, and a fourth magnetic layer interposed between the second non-magnetic layer and the substrate and antiferromagnetically bonded to the second magnetic layer to have a uniaxial magnetic anisotropy in the opposite direction to the magnetic anisotropy of the second magnetic layer.

The antiferromagnetic layer may include an IrMn layer.

The first, second, third and fourth magnetic layers may individually include a Co-based alloy, such as Co, CoFe, CoFeB, CoZrNb, CoTaZr or NiFeCo. Other possible materials such as NiFe.

The first, second, third and fourth magnetic layers may individually have a thickness of 20 nm or less.

The second magnetic layer may be thinner than the first or third magnetic layer. The fourth magnetic layer may be thinner than the first or third magnetic layer. The first and third magnetic layer may individually have a thickness of 10-20 nm. The second and fourth magnetic layers may individually have a thickness of 5-10 nm.

The second or fourth magnetic layer may have a saturation magnetization less than that of the first or third magnetic layer.

The first or second non-magnetic layer may include an Ru layer.

When the substrate has a disk form, the magnetic anisotropies of the magnetic layers may be aligned in a radial direction of a disk.

According to an exemplary embodiment of the present invention, a perpendicular magnetic recording medium which can suppress magnetic domain noise while improving a write performance can be provided.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF EXEMPLARY EMBODIMENTS OF THE INVENTION

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

According to an exemplary embodiment of the present invention, there is provided a laminated SUL structure which can effectively enhance perpendicular writing field and effectively prevent an occurrence of magnetic domain noise during a writing operation by a recording head. In the present exemplary embodiment, an antiferromagnetic layer is interposed between magnetic layers. The magnetic layer formed on the antiferromagnetic layer has a triple-layered structure comprising a magnetic layer, a non-magnetic layer and a magnetic layer. Such a triple-layered structure can also be applied to the magnetic layer formed below the antiferromagnetic layer.

The triple-layered magnetic layer structure in the present exemplary embodiment is proposed in order to increase the uniaxial anisotropy through an effect known as Ruderman-Kittel-Kasuya-Yosida (RKKY) coupling. The triple-layered structure uses a material having a relatively large saturation magnetization $M_s$ for improving a write performance. The layers of such a structure are formed as a very thin film in order to suppress magnetic domain noise by preventing the formation of Bloch wall.

Factors to be considered when designing an SUL for perpendicular magnetic recording media according to an exemplary embodiment of the present invention as a laminated structure will first be described. Although various factors can be considered in terms of the characteristics of the laminated SUL structure, it may be desired that the SUL has a sufficient saturation magnetization $M_{S,SUL}$ and a sufficient thickness $t_{SUL}$. If the SUL has a relatively small $M_{S,SUL}$ and $t_{SUL}$, the SUL cannot sufficiently transfer a magnetic flux entered from a trailing pole 21 of a head 20 (see FIG. 1) and a saturation area is formed below the trailing pole 21.

Figure 2:
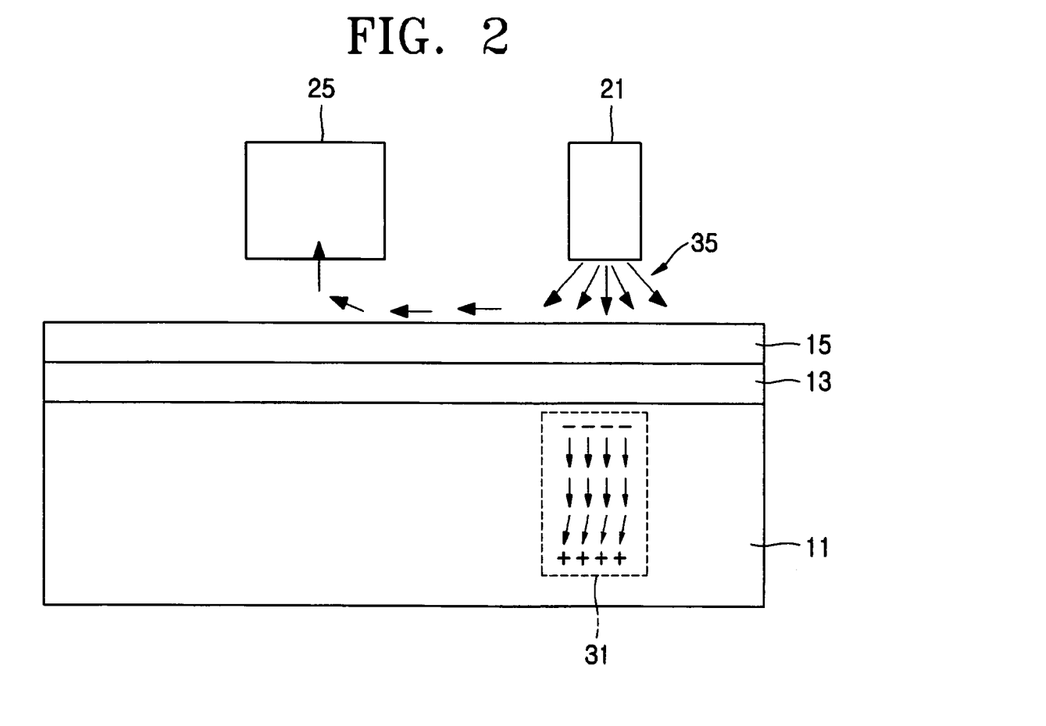
FIG. 2 is a schematic diagram for explaining a magnetic saturation of an SUL used in a perpendicular magnetic recording medium.

FIG. 2 is a schematic diagram for explaining the magnetic saturation of an SUL.

Referring to FIG. 2, when a writing operation is performed in a typical magnetic recording medium 10 (see FIG. 1) for recording, a saturation area 31 can be generated below the trailing pole 21. When the saturation area 31 is generated in the SUL 11, magnetic charges accumulated on the bottom surface of the SUL 11 diminish the write field. On the other hand, magnetic charges of an opposite sign accumulated on the top surface of the SUL 11 enhances the write field.

Nevertheless, the magnetic charges of an opposite sign accumulated on the bottom surface produce leakage of the magnetic flux. Finally, the generation of the saturation area 31 rapidly deteriorates the field gradient of the trailing pole 21. The reason being that, the magnetic flux 35 cannot enter into the SUL 11 and returns to a return pole 25 along the surface of a recording layer 15. As a result, the perpendicular head 20 (see FIG. 1) operates like a typical longitudinal recording head.

Accordingly, the magnetic charges accumulated on the top surface of the SUL 11 should be maximized but the magnetic charges of an opposite sign accumulated on the bottom surface should be minimized. Further, the magnetic charges accumulated at the top of the SUL should not be saturated.

To avoid or prevent the saturation of the SUL 11, the saturation magnetization $M_{S,SUL}$ of the SUL 11 may be greater or equal to the saturation magnetization $M_{S,PT}$ of the trailing pole 21. This is because the saturation of the SUL 11 is suppressed if the value of $4\pi M_{S,SUL} \times A_{SUL}$ is greater than or equal to the value of $4\pi M_{S,PT} \times A_{PT}$. Here, $A_{SUL}$ is an effective area of the SUL into which a magnetic flux enters and $A_{PT}$ is an area of an air bearing surface (ABS) of the trailing pole 21.

Figure 3:
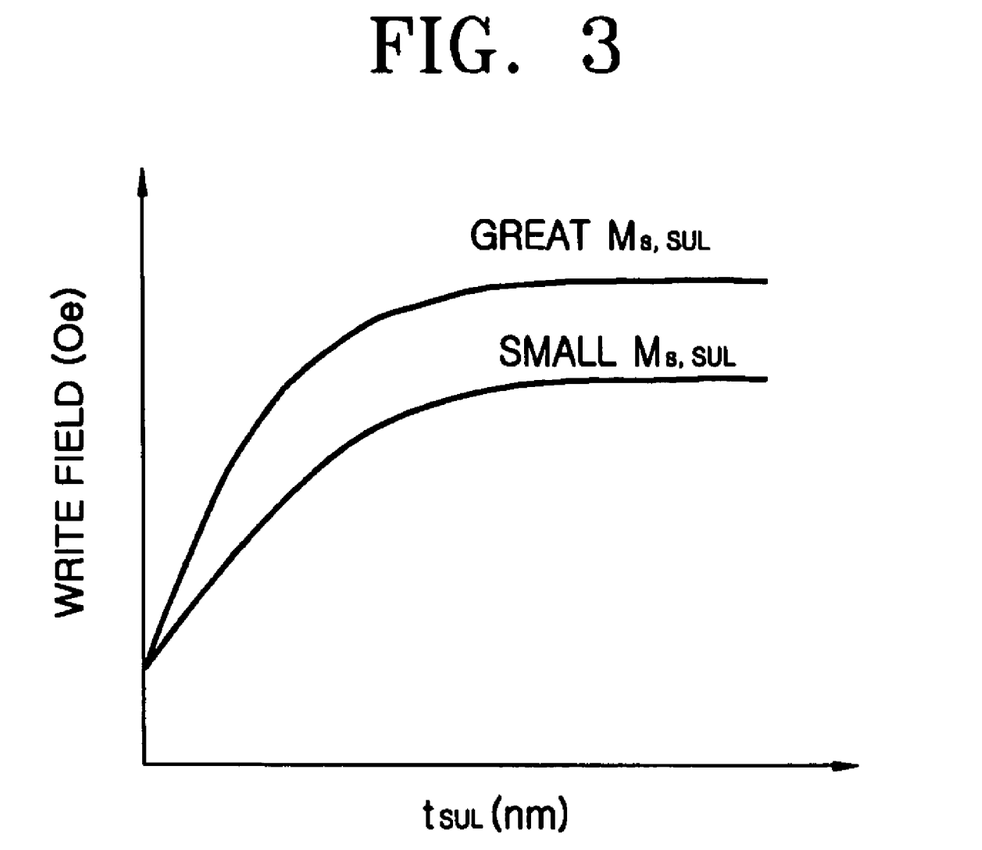
FIG. 3 is a graph for explaining the relationship between a thickness and a write field of the SUL used in a perpendicular magnetic recording medium.

FIG. 3 is a graph schematically illustrated for explaining the relationship between a thickness of an exemplary SUL and a write field.

Referring to FIG. 3, a relatively great saturation magnetization $M_{S,SUL}$ can provide a stronger write field than a small saturation magnetization $M_{S,SUL}$. As the thickness of the SUL increases, the intensity of the write field increases. Thus, a relatively thick SUL is advantageous in terms of the write field.

A permeability of an SUL can be expressed as $1+(4\pi M_{S,SUL})/(H_{K,SUL}+H_{ex})$. Such a permeability maybe approximately equal to 500 or more. High $H_{K,SUL}$ of the SUL can prevent a dead layer from being generated on the top surface and diminish magnetic domain noise. A dead layer refers to the top surface of the SUL where saturation of magnetic charges occurs. Here, $H_{K, SUL}$ denotes an intensity of a magnetic field to be applied in order to align spins with a magnetization hard axis. As $H_{K, SUL}$ increases, the magnetic field required to align the spins with the magnetization hard axis from a magnetization easy axis is increased. $H_{ex}$ denotes an exchange field.

The SUL may have high permeability and saturation magnetization $M_{S, SUL}$. However, a thick SUL can result in undesired magnetic domain noise upon the magnetization of the SUL and complicated three-dimensional vortices and spin-wave like spatial oscillation. Thus, the thickness of the SUL should be controlled so as to solve these problems while having a relatively high saturation magnetization. The present exemplary embodiments provide a multi-layered SUL structure to address the problems that result from such a thick SUL.

In order to illustrate the effects of addressing the problems of conventional SUL's, an influence of a magnetic domain wall on spike noises should first be considered for understanding of noises relevant to a domain. The magnetic domain wall generally may be divided into two types of a Bloch wall and a Neel wall. The Bloch wall results in more noise spikes due to magnetic charges in the magnetic domain wall when compared to the Neel wall. Thus, such a Bloch wall formation should be suppressed to solve the magnetic domain noise problem. Bloch wall exists in thick film while Neel wall exists in thin film.

When calculating an energy of the magnetic domain wall with respect to a thickness of a magnetic layer, a transition from the Neel wall to the Bloch wall occurs at the thickness of about 20 nm when a saturation magnetization is about 1400 emu/cc. Thus, when the thickness of the magnetic layer is less than about 20 nm, the Bloch wall can be suppressed.

Consequently, a domain size of an SUL should be diminished in order to suppress the magnetic domain noise. The domain size depends on an anisotropy constant $K_1$, a saturation magnetization $M_s$, a thickness, a surface roughness, etc. of the SUL. Thus, the SUL structure according to an exemplary embodiment of the present invention has a great anisotropy constant $K_1$, and a great saturation magnetization $M_s$, and includes thin layers in order to suppress the Bloch wall. Accordingly, the SUL structure according to an exemplary embodiment of the present invention can effectively address the magnetic domain noise problem.

Figure 4:
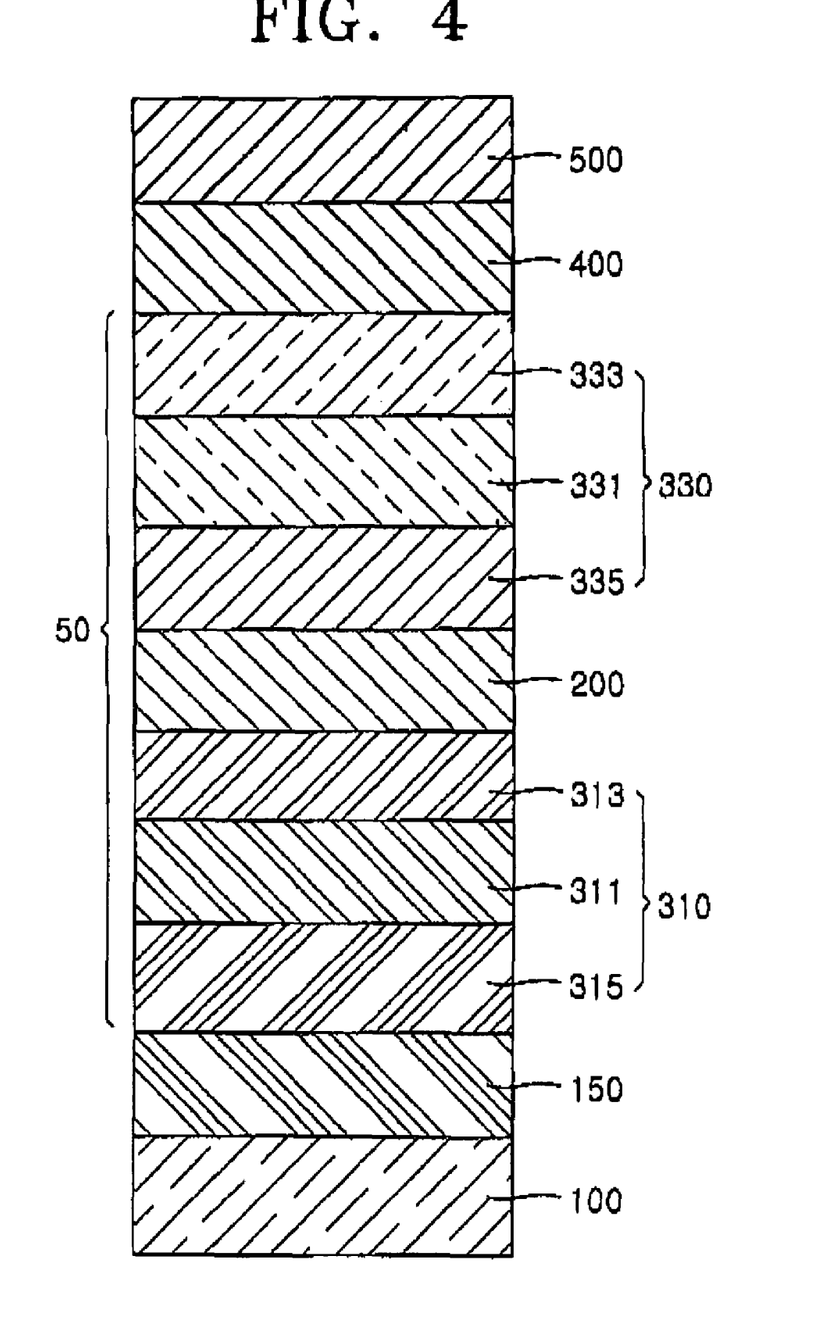
FIG. 4 is a schematic cross-sectional view for explaining a perpendicular magnetic medium according to an exemplary embodiment of the present invention.

FIG. 4 is a schematic cross-sectional view for explaining a perpendicular magnetic recording medium according to an exemplary embodiment of the present invention.

Referring to FIG. 4, the perpendicular magnetic recording medium according to an exemplary embodiment of the present invention includes a recording layer 500 for perpendicular magnetic recording, formed on a disk-like substrate 100. Although it is not shown, a head and a protective layer for protecting the recording layer 500 from outside air can further be formed on the recording layer 500. An intermediate layer 400 is formed between the substrate 100 and the recording layer 500 to improve the crystal orientation and magnetic properties of the recording layer 500. Layer 400 also helps to decouple the recording layer 500 from the SUL.

An SUL 50 structure is formed below the intermediate layer located between the recording layer 500 and the substrate 100. A seed layer or lower layer 150 for growing the SUL 50 can be formed between the SUL 50 and the substrate 100. The lower layer 150 can be a single or multilayer of Ta, Ru or NiFeCr layer.

The SUL 50 according to an exemplary embodiment of the present invention is basically formed in a structure with laminated multiple layers and is wholly designed so as to display a soft magnetic property. For example, an antiferromagnetic layer 200 is located in the middle of the SUL structure 50. A laminated magnetic layer structure 330 can be formed on the antiferromagnetic layer 200 and a laminated magnetic layer structure 310 can be formed below the antiferromagnetic layer 200.

The antiferromagnetic layer 200 can be formed by sputtering an antiferromagnetic materials such as IrMn and PtMn. The antiferromagnetic layer 200 induces magnetic layers 313 and 335, respectively, formed on and below the antiferromagnetic layer 200 to have opposite unidirectional anisotropy directions to each other through the exchange bias coupling. In the case of an IrMn layer, an exchange bias can be changed depending on a thickness thereof. When the thickness is about 10 nm, the exchange bias is relatively great. Thus, the IrMn layer can have a thickness ranging from several nm to tens of nm, and may have a thickness of 20 nm or less, and may further have a thickness of about 10 nm.

The laminated magnetic layer structure 330 formed on the antiferromagnetic layer 200 has a synthetic antiferromagnetic (SAF) bonding. That is, the laminated magnetic layer structure 330 has a thin non-magnetic layer 331 interposed between magnetic layers 333 and 335. When one magnetic layer of the magnetic layers 333 and 335 is magnetized in a constant direction, the non-magnetic layer 331 induces the other magnetic layer to be magnetized in the opposite direction through RKKY coupling. That is, the non-magnetic layer 331 induces the magnetic layers 333 and 335 to form the SAF bonded structure. Thus, two uniaxial anisotropy surfaces are formed.

The non-magnetic layer 331 can be formed as a conductive layer of Cu, Ru, Pd, Pt, etc., but an Ru layer may be used such that strong RKKY coupling can be obtained. The Ru layer can have a thickness ranging from about several Å to several nm, and preferably a thickness of about 0.8-9 nm, which is advantageous for inducing the antiferromagnetic coupling. In particular, the Ru thickness is such that antiferromagnetic coupling can be achieved for two magnetic layers next to the Ru layer.

The magnetic layers 333 and 335 formed on and below the non-magnetic layer 331 can be composed of various magnetic materials, for example, CoFe-based alloys such as $Co_{90}Fe_{10}$ or $Co_{35}Fe_{65}$ or/and Co-based alloys such as Co, CoNiFe, CoFeB, CoZrNb or CoTaZr and NiFe. These magnetic layers 333 and 335 can have a thickness ranging from several nm to tens of nm, and may have a thickness less than about 20 nm for preventing the formation of a Bloch wall.

A single magnetic layer can be formed below the antiferromagnetic layer 200, but an SAF structure is preferably, but not necessarily, formed. That is, similar to the laminated structure formed on the antiferromagnetic layer 200, a structure comprising a magnetic layer 315, a non-magnetic layer 311 and a magnetic layer 313 is formed below the antiferromagnetic layer 200. That is, the antiferromagnetic layer 200 is interposed between two laminated magnetic layer structures 310 and 330.

The non-magnetic layer 311 can also be an Ru layer of about 0.8-9 nm. The magnetic layers 313 and 315 formed on and below the Ru layer can also be composed of a magnetic material, such as Co, $Co_{90}Fe_{10}$, $Co_{35}Fe_{65}$, CoFeB, CoZrNb and the like and have a thickness less than about 20 nm for preventing the formation of Bloch wall.

Nevertheless, thicknesses of the magnetic layers 313 and 315 (hereinafter, referred to as a first magnetic layer 315 and a second magnetic layer 313) formed below the antiferromagnetic layer 200 may be less than those of the magnetic layers 333 and 335 (hereinafter, referred to as a third magnetic layer 335 and a fourth magnetic layer 333) formed on the antiferromagnetic layer 200. For example, when the thicknesses of the third magnetic layer 335 and the fourth magnetic layer 333 are about 10-20 nm, the thicknesses of the first magnetic layer 315 and the second magnetic layer 313 can be about 5-10 nm.

By forming the first magnetic layer 315 and the second magnetic layer 313 having thicknesses less than those of the third magnetic layer 335 and the fourth magnetic layer 333, the layers formed below the antiferromagnetic layer 200 can secure a relatively strong SAF bonding. The reason being that the strength of the SAF bonding depends strongly on the magnetic layer thickness. A thin magnetic layer will have a stronger SAF bonding than the thick magnetic layer. Due to the strong SAF bonding, a strong uniaxial anisotropy can prevent the formation of magnetic domains and magnetic charges, which can undesirably be accumulated on the bottom surface of the SUL 50.

When the thicknesses of the magnetic layers are less than about 20 nm, an additional effect of preventing an eddy current can be obtained.

The first magnetic layer 315 and the second magnetic layer 313 may be composed of a magnetic material with a saturation magnetization $M_s$ greater than that of a magnetic material of the third magnetic layer 335 and the fourth magnetic layer 333. That is, the first magnetic layer 315 and the second magnetic layer 313 can be composed of a magnetic material with a relatively great saturation magnetization $M_s$ and the third magnetic layer 335 and the fourth magnetic layer 333 can be composed of a relatively small saturation magnetization $M_s$. Such a structure can significantly improve a signal to noise ratio (SNR) of the perpendicular magnetic recording medium.

The magnetic layers may be formed by means of a deposition or sputtering process under lower pressures.

The antiferromagnetic layer 200 located in the middle of the laminated SUL 50 structure provides an exchange bias. The exchange bias set unidirectional anisotropies of two SAF structures formed on and below the antiferromagnetic layer 200 in a radial direction of the substrate 100. Thereby, two unidirectional anisotropy surfaces are left on upper and lower surfaces of the antiferromagnetic layer 200. In the entire laminated SUL 50 structure, two SAF structures formed on and below the antiferromagnetic layer 200 are magnetically equalized so that the entire laminated SUL 50 structure has a remnant magnetization of zero (0). That is, in this SUL 50 structure, net magnetic moments of the magnetic layers mutually cancel.

The SUL 50 structure according to an exemplary embodiment of the present invention has the magnetic layer structure that behaves like a single magnetic layer on and/or below the antiferromagnetic layer to improve the characteristics of the SUL 50. The effect of introducing the antiferromagnetic layer will first be described.

Figure 5:
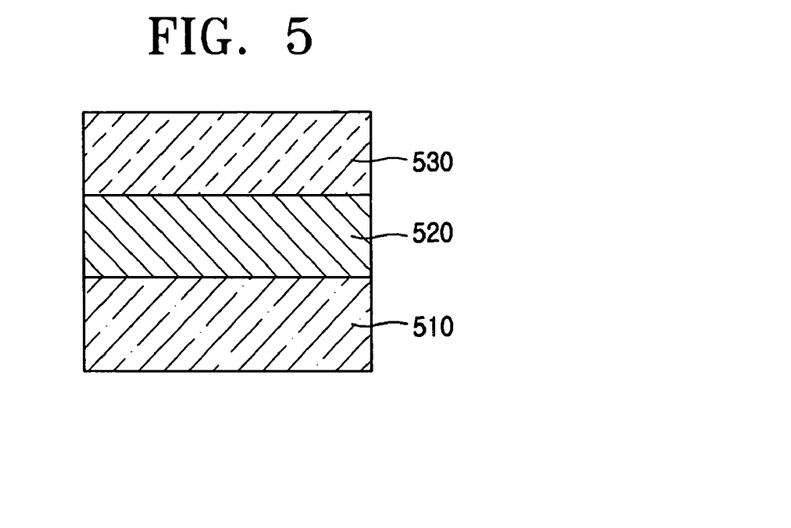
FIG. 5 is a schematic cross-sectional view for explaining a structure with a magnetic layer formed on an antiferromagnetic layer according to an exemplary embodiment of the present invention.
Figure 6:
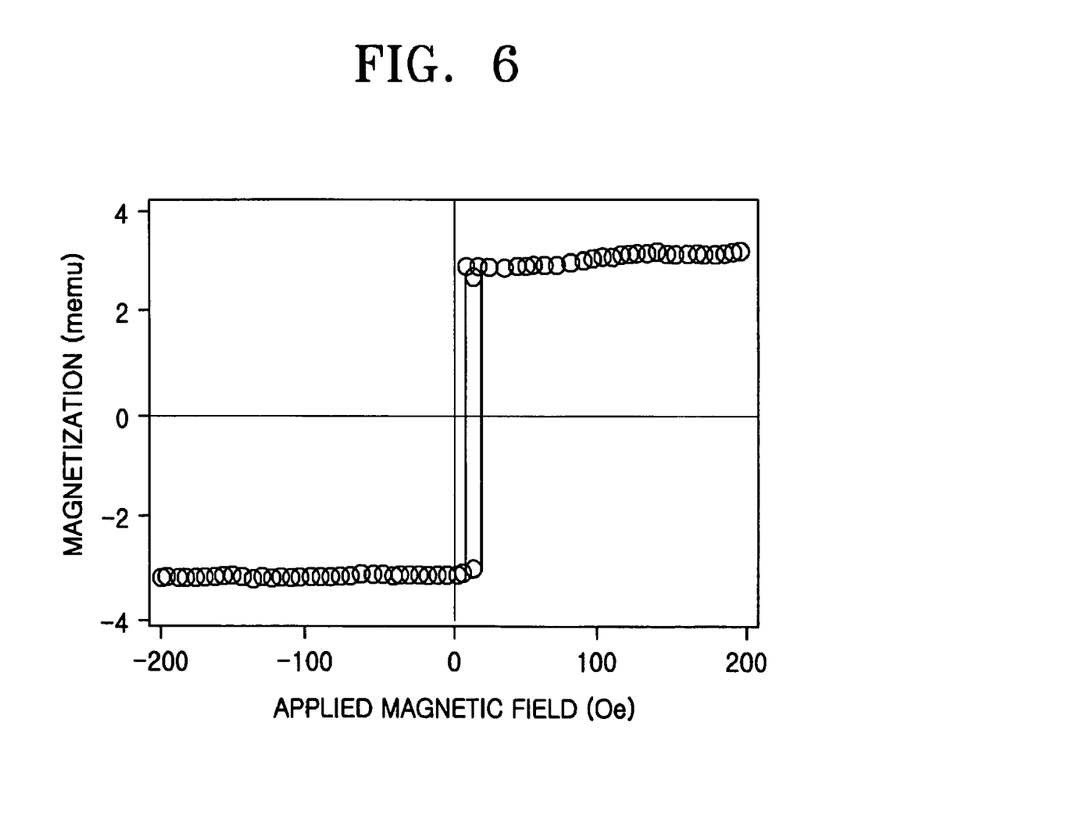
FIG. 6 is an experimental graph mechanically illustrating a magnetic hysteresis curve of the laminated structure of FIG. 5.

FIG. 5 is a schematic cross-sectional view for explaining a structure having a magnetic layer on an antiferromagnetic layer according to an exemplary embodiment of the present invention. FIG. 6 is a graph obtained from experimentation showing a magnetic hysteresis curve of the laminated structure of FIG. 5.

Referring to FIG. 5, an antiferromagnetic layer 520 including an IrMn layer can be formed on a lower layer 510 of a single or multilayer of Ta, Ru or NiFeCr layer and a magnetic layer 530 can be formed on the antiferromagnetic layer 520. In this structure, an exchange bias can induce a unidirectional magnetization anisotropy in the magnetic layer 530.

Such a structure can display a magnetic hysteresis curve as illustrated in FIG. 6. Referring to FIG. 6, the center of a loop of the magnetic hysteresis curve shifts. This indicates that a remnant magnetization of the structure is not zero (0). The structure illustrated in FIG. 5 should have a remnant magnetization of zero (0) or near to zero (0) in order to be employed as an SUL.

Figure 7:
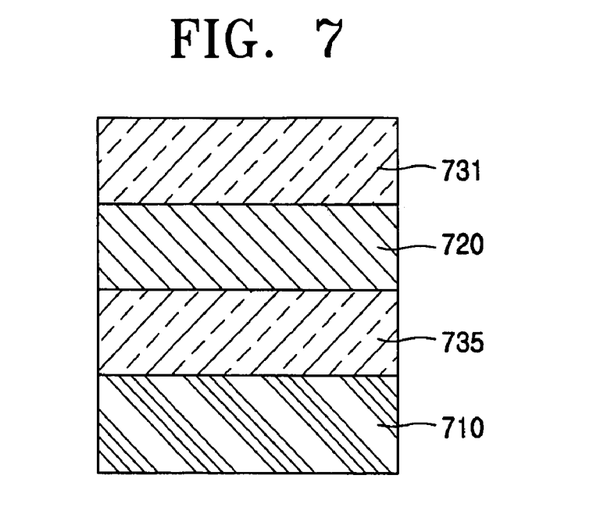
FIG. 7 is a schematic cross-sectional view for explaining a structure consisting of a magnetic layer, an antiferromagnetic layer and a magnetic layer according to an exemplary embodiment of the present invention.
Figure 8:
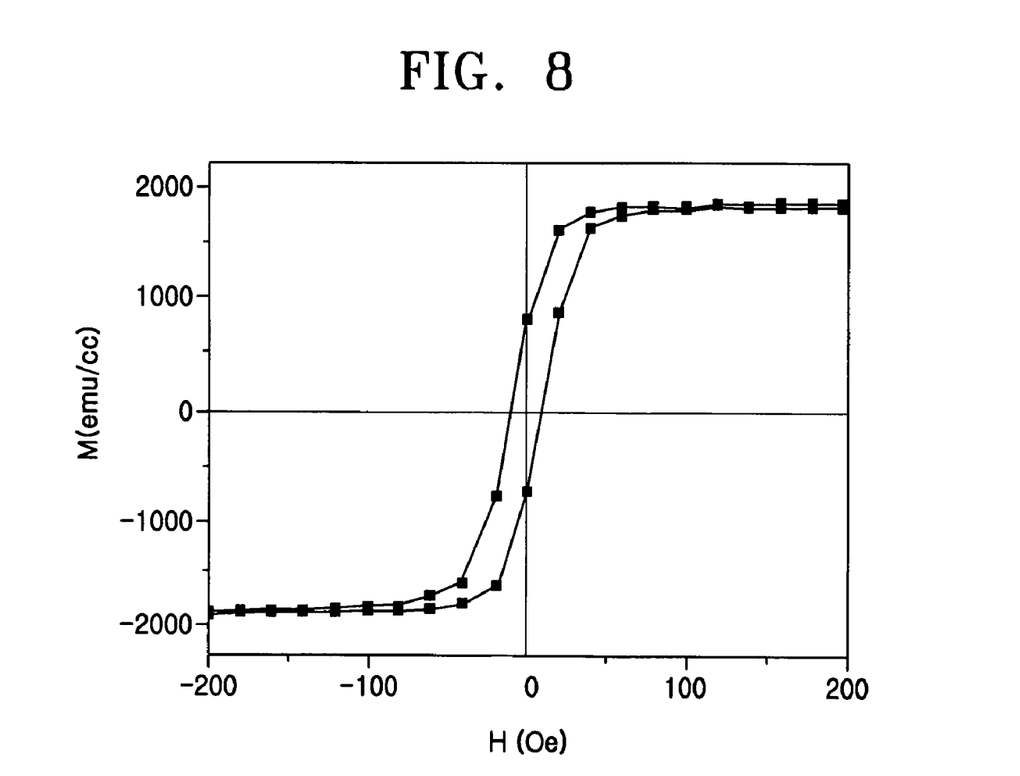
FIG. 8 is an experimental graph schematically illustrating a magnetic hysteresis curve of the laminated structure of FIG. 7.

FIG. 7 is a schematic cross-sectional view for explaining a structure comprising a magnetic layer, an antiferromagnetic layer and a magnetic layer according to an exemplary embodiment of the present invention. FIG. 8 is a graph with experimental data illustrating a magnetic hysteresis curve of the laminated structure of FIG. 7.

Referring to FIG. 7, an antiferromagnetic layer 720 including an IrMn layer is formed on a lower layer 710 of a single or multilayer of Ta, Ru or NiFeCr layer, a first CoFe magnetic layer 731 is formed on the antiferromagnetic layer 720 and a CoFe layer as a second magnetic layer 735 is formed below the antiferromagnetic layer 720. In this structure, two exchange biases occur at two interfaces. The two exchange biases allow the first and second magnetic layers 731 and 735 to have unidirectional anisotropies in opposite magnetization directions by properly choosing the thickness of the antiferromagnetic layer 720.

This structure can display a magnetic hysteresis curve illustrated in FIG. 8. Referring to FIG. 8, the center of a loop of the magnetic hysteresis curve is located at the center of the coordinate. That is, a remnant magnetization of the structure is close to zero (0). Not exactly zero due to the media hysteresis.

Figure 9:
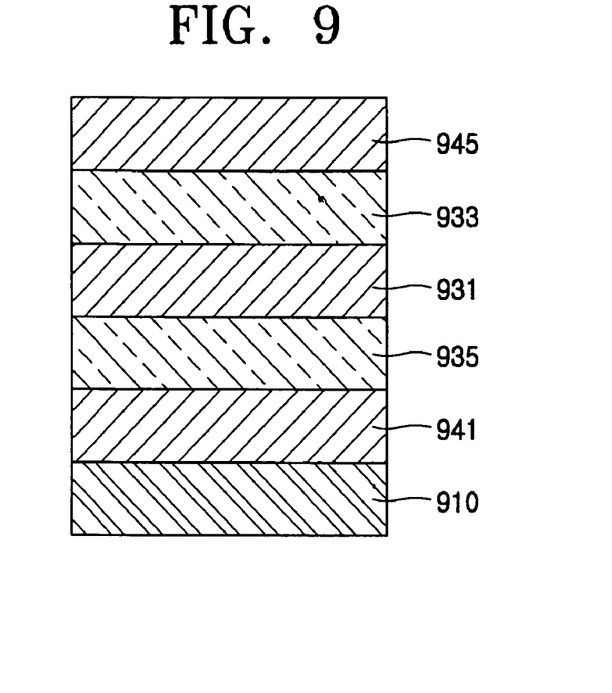
FIG. 9 is a schematic cross-sectional view for explaining a structure consisting of a magnetic layer, a non-magnetic layer and a magnetic layer according to an exemplary embodiment of the present invention.
Figure 10:
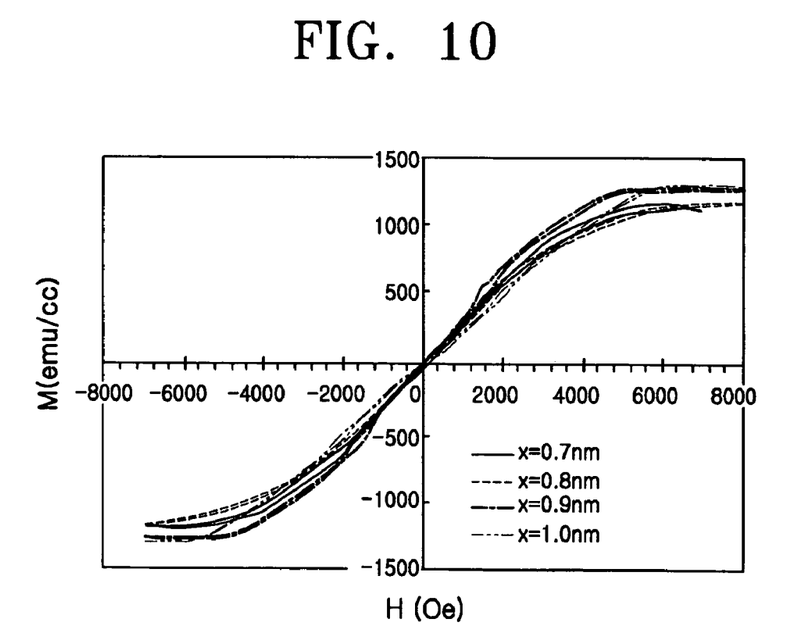
FIG. 10 is an experimental graph schematically illustrating a magnetic hysteresis curve of the laminated structure of FIG. 9 in a magnetization easy axis direction.
Figure 11:
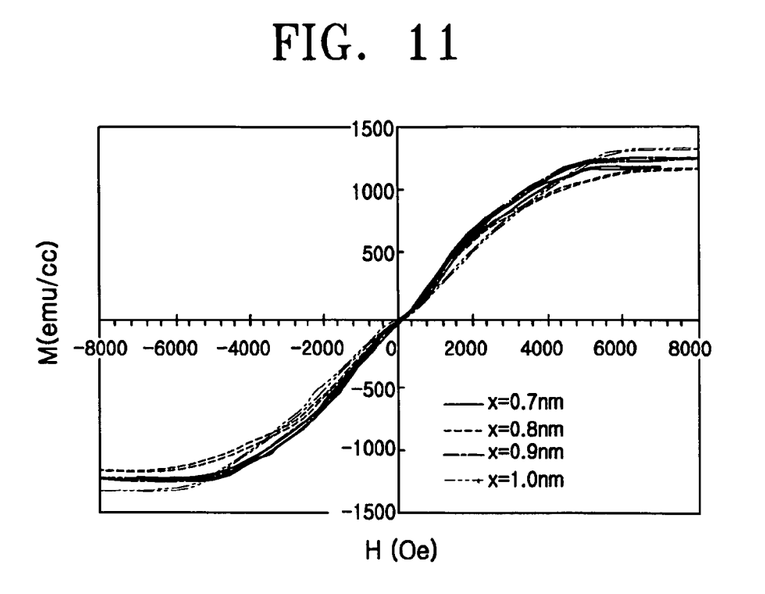
FIG. 11 is an experimental graph schematically illustrating a magnetic hysteresis curve of the laminated structure of FIG. 9 in a magnetization hard axis direction.

FIG. 9 is a schematic cross-sectional view for explaining a structure consisting of a magnetic layer, a non-magnetic layer and a magnetic layer according to an exemplary embodiment of the present invention. FIG. 10 is a graph having experimental data illustrating a magnetic hysteresis curve of the laminated structure of FIG. 9 in a magnetization easy axis. FIG. 11 is a graph having experimental data illustrating a magnetic hysteresis curve of the laminated structure of FIG. 9 in a magnetization hard axis.

Referring to the exemplary embodiment of FIG. 9, an Ru layer as a non-magnetic layer 931 is formed on top a 5 nm, thick Ta lower layer 910, and a 3 nm thick $Co_{90}Fe_{10}$ first magnetic layer 933 and a 3 nm thick $Co_{90}Fe_{10}$ second magnetic layer 935 are formed on and below the non-magnetic layer 931, respectively. This structure is equivalent to the laminated magnetic layer structure having the antiferromagnetic layer 200 interposed between the magnetic layers as described above with reference to FIG. 4. A 10 nm thick Ru layer 945 is additionally formed on the first magnetic layer 933 and a 10 nm thick Ru layer 941 is additionally formed below the second magnetic layer 935.

FIGS. 10 and 11 illustrate the results of measuring the magnetic hysteresis curves in a magnetization easy axis and a magnetization hard axis of the structure illustrated in FIG. 9, wherein the thickness of the Ru layer used as the non-magnetic layer 931 is increased from 0.7 nm to 1 nm at intervals of 0.1 nm. According to the results illustrated in FIGS. 10 and 11, the laminated magnetic layer structure comprising of the magnetic layer 933, the non-magnetic layer 931 and the magnetic layer 935 of the present exemplary embodiment shows the same behaviour as that of a single magnetic layer with an anisotropic magnetic field greater than 6000 Oe. The laminated magnetic layer structure has a very small hysteresis.

Figure 12:
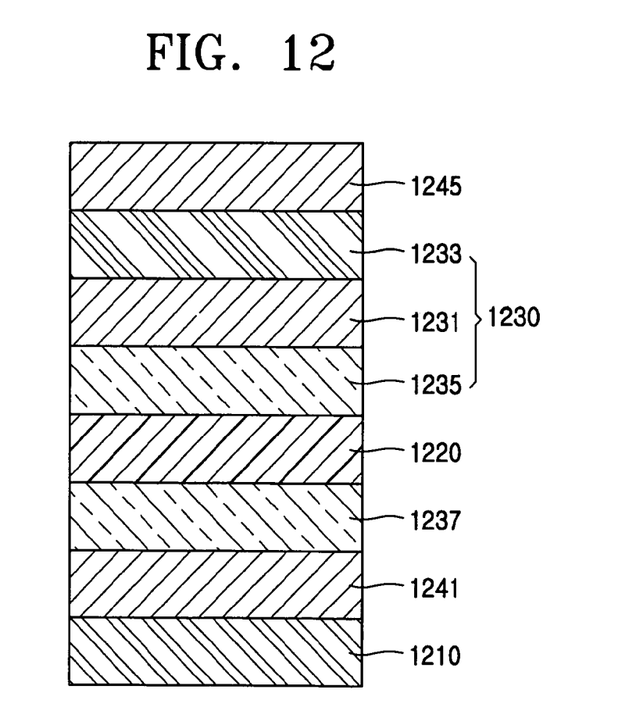
FIG. 12 is a schematic cross-sectional view for explaining an SUL structure according to an exemplary embodiment of the present invention.
Figure 13:
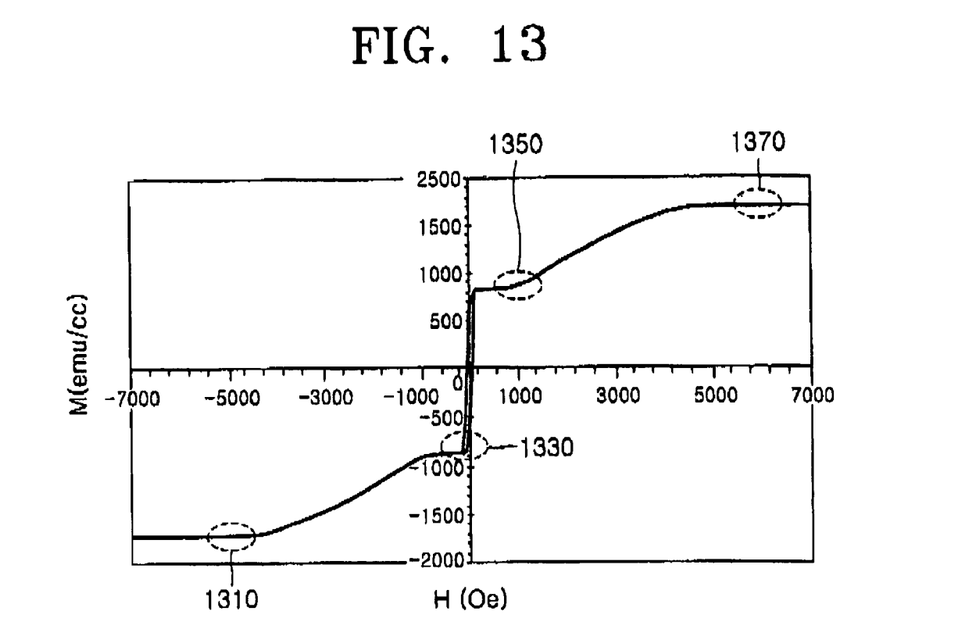
FIG. 13 is an experimental graph schematically illustrating a magnetic hysteresis curve of the SUL structure of FIG. 12.
Figure 14:
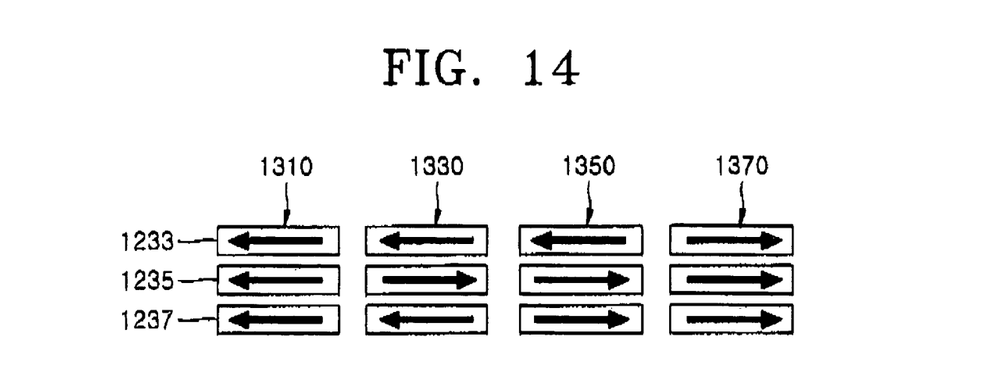
FIG. 14 is schematic diagrams for explaining magnetization states in individual representative points of FIG. 13.

FIG. 12 is a schematic cross-sectional view for explaining an SUL structure according to a further exemplary embodiment of the present invention. FIG. 13 is a graph illustrating experimental data of a magnetic hysteresis curve of the SUL structure of FIG. 12. FIG. 14 is a schematic diagram for explaining magnetization states in individual representative points of FIG. 13.

Referring to FIG. 12, a 10 nm thick antiferromagnetic layer 1220 including a IrMn layer is formed on a 5 nm thick Ta layer 1210 and a 10 nm thick Ru layer 1241. A 0.7 nm thick Ru layer as a non-magnetic layer 1231 is formed on the antiferromagnetic layer 1220, and a 3 nm thick CoZrNb (CZN) layer as a first magnetic layer 1233 and a 3 nm thick $Co_{90}Fe_{10}$ layer as a second magnetic layer 1235 are formed on and below the non-magnetic layer 1231, respectively. Such a structure is equivalent to the laminated magnetic structures 310 or 330 formed on and below the antiferromagnetic layer 200 as described above with reference to FIG. 4. A 10 nm thick Ru layer 1245 can be further formed on the first magnetic layer 1233. A 3 nm thick $Co_{90}Fe_{10}$ layer as a third magnetic layer 1237 is formed below the antiferromagnetic layer 1220.

This structure can display the magnetic hysteresis curve illustrated in FIG. 13. Referring to FIG. 13, the center of a loop of the magnetic hysteresis curve is located in the center of the coordinates. FIG. 14 illustrates magnetization states of individual magnetic layers 1233, 1235 and 1237 at each representative points 1310, 1330, 1350 and 1370 according to the application of an external magnetic field. Referring to FIG. 14, the second and third magnetic layers 1235 and 1237, which are $Co_{90}Fe_{10}$ layers formed on and below the antiferromagnetic layer 1220, are constrained or pinned in the opposite direction each other.

As apparent from the results of FIG. 14, the SUL structure according to the present exemplary embodiment can maintain a relatively small coercivity while having a relatively great anisotropic magnetic field and a relatively great permeability μ.

As described above, the SUL structure according to the exemplary embodiments of the present invention can be obtained by sequentially laminating multiple layers. A magnetization easy axis in a radial direction can be formed on the substrate by applying an anisotropic magnetic field when laminating the layers.

Figure 15:
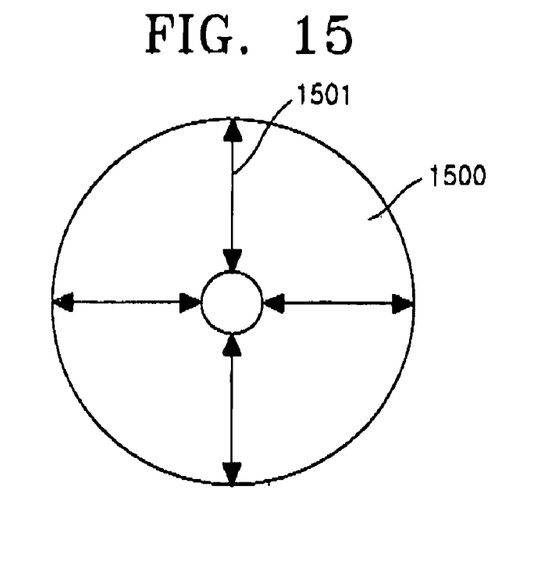
FIGS. 15 through 17 are schematic diagrams for explaining a method of forming an SUL structure according to an exemplary embodiment of the present invention.

FIG. 15 is a schematic diagram for explaining a magnetization easy axis or uniaxial anisotropy axis which is set when forming an SUL structure according to an exemplary embodiment of the present invention. Referring to FIG. 15, the magnetization easy axis 1501 is set in a radial direction of a disk-like substrate 1500.

Figure 16:
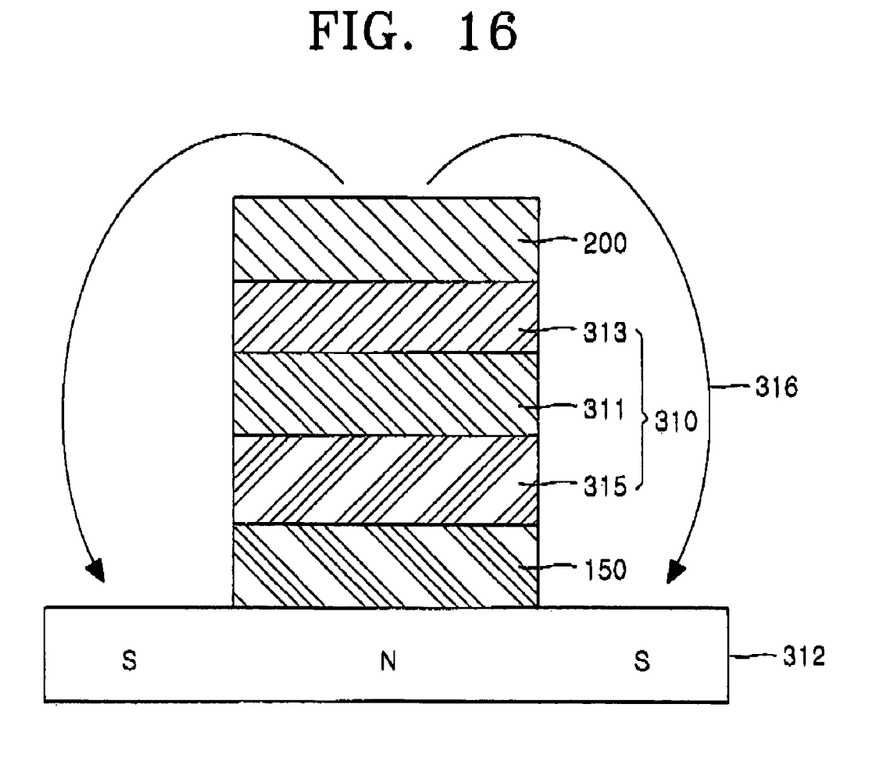

FIG. 16 is a schematic diagram for explaining a process of forming the first laminated magnetic layer structure 310, shown in FIG. 4, while applying a first magnetic field 316, according to the exemplary embodiment of the present invention. Referring to FIG. 16, the first laminated magnetic layer structure 310 is formed on a substrate 312 while applying a first magnetic field 316 in a first radial direction formed by locating an N pole in the center of the substrate 312 and S poles in the outer region of the substrate 312.

For example, while applying the first magnetic field 316, a single or multilayer of Ta, Ru or NiFeCr layer is formed as the lower layer 150 and the first magnetic layer 315 with a thickness of about 5-10 nm is formed thereon. A 0.8 nm thick Ru layer as the non-magnetic layer 311 is formed on the first magnetic layer 315 and the second magnetic layer 313 with a thickness of about 5-10 nm is formed thereon, thereby forming the first laminated magnetic layer structure 310. The antiferromagnetic layer 200 is formed on the first laminated structure 310. This process of forming the layers may be performed by sputtering under a relatively low pressure so as to allow the layers to have a flat surface.

Figure 17:
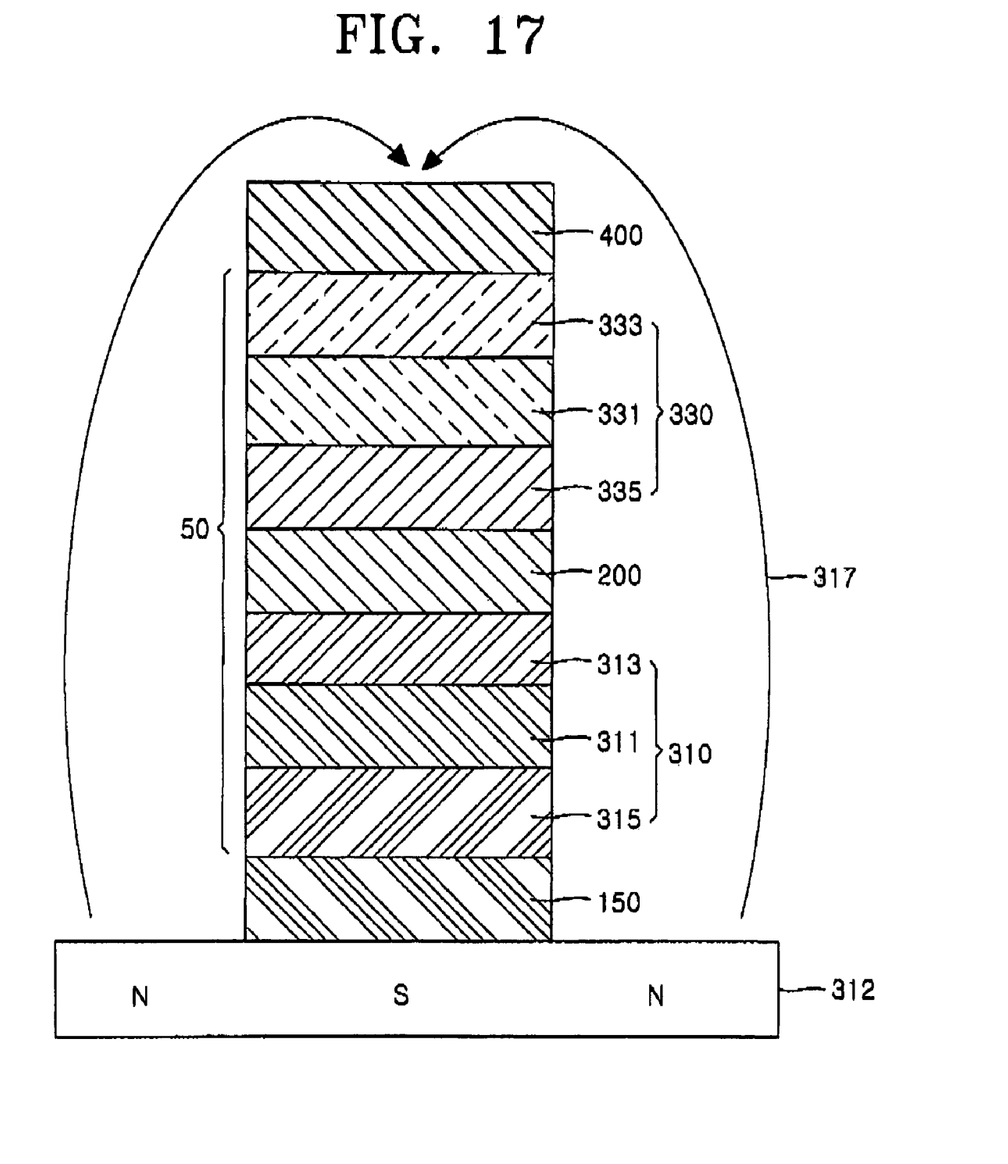

FIG. 17 is a schematic diagram for explaining a process of forming the second laminated magnetic layer structure 330, shown in FIG. 4, while applying a second magnetic field 317 according to an exemplary embodiment of the present invention. Referring to FIG. 17, the second laminated magnetic layer structure 330 is formed on the substrate 312 while applying the second magnetic field 317 in a radial direction opposite to the direction of the first magnetic field 316. The second magnetic field 317 is formed by locating S poles in the center of the substrate 312 and an N pole in the outer region of the substrate 312.

For example, while applying the second magnetic field 317, the third magnetic layer 335 with a thickness of about 10-20 nm is formed on an antiferromagnetic layer 200. A 0.8 nm thick Ru layer is formed as the non-magnetic layer 331 and the fourth magnetic layer 333 with a thickness of about 10-20 nm is formed thereon, thereby forming the second laminated magnetic layer structure 330. This process of forming the layers may be performed by sputtering under a relatively low pressure so as to allow the layers to have a flat surface. Subsequently, the intermediate layer 400 can be formed on the second laminated magnetic layer structure 330 and the recording layer 500 can be formed thereon.

The SUL structure according to the present embodiment can be formed by laminating the layers by means of sputtering while applying magnetic fields in the opposite radial direction to each other as described above. That is, the SUL structure can be made by a method of producing perpendicular magnetic recording media, including: preparing a disk-like substrate; sequentially forming a first magnetic layer, a first non-magnetic layer, a second magnetic layer and an antiferromagnetic layer on the substrate by sputtering while applying a first magnetic field in a radial direction; sequentially forming a third magnetic layer, a second non-magnetic layer and a fourth magnetic layer on the antiferromagnetic layer by sputtering while applying a second magnetic field in the opposite direction to the direction of the first magnetic field; and sequentially forming an intermediate layer and a perpendicular magnetic recording layer on the fourth magnetic layer.

As described above, according to the exemplary embodiments of the present invention, an SUL structure with an antiferromagnetic layer interposed between laminated magnetic layer structures comprising a magnetic layer, a non-magnetic layer and a magnetic layer can be formed.

The SUL structure according to the exemplary embodiments of the present invention can be formed by laminating thin layers to maintain a relatively small coercivity $H_C$, In addition, undesired magnetic charges can be prevented from being accumulated on the bottom surface and complicated magnetical vortices can be prevented from being formed.

The SUL structure according to the exemplary embodiments of the present invention can have relatively great permeability. The SUL structure can also have a great anisotropic magnetic field $H_{K, SUL}$ to suppress magnetic domain noise. In addition, the SUL structure can ensure unidirectional anisotropies of magnetic layers so as to prevent the formation of domains, thereby removing undesired magnetic charges accumulated on the bottom surface by means of the RKKY interaction.

The magnetic layers included in the SUL structure of the exemplary embodiments of the present invention may have thicknesses of about 20 nm or less to prevent the formation of a Bloch wall. Thus, magnetic domain noise resulted from the Bloch wall can be diminished. The magnetic layers included in a laminated magnetic layer structure, which is formed on an antiferromagnetic layer, have thicknesses greater than those of the magnetic layers included in a laminated magnetic layer structure, which is formed below the antiferromagnetic layer and are composed of a magnetic material with a relatively great saturation magnetization $M_S$ so as to improve the SNR (signal/noise ratio) of a perpendicular magnetic recording medium.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A perpendicular magnetic recording medium comprising:
    a substrate;
    a perpendicular magnetic recording layer disposed on the substrate; and
    a soft magnetic underlayer (SUL) interposed between the substrate and the perpendicular magnetic recording layer, the soft magnetic underlayer comprising,
        a first magnetic layer and a second magnetic layer having unidirectional magnetic anisotropies in directions opposite to each other by an exchange bias;
        an antiferromagnetic layer interposed between the first magnetic layer and the second magnetic layer;
        a non-magnetic layer disposed at least on one of the first magnetic layer and the second magnetic layer; and
        a third magnetic layer disposed on the non-magnetic layer and antiferromagnetically bonded to the at least one of the first and second magnetic layers which has the non-magnetic layer disposed thereon, to have a uniaxial magnetic anisotropy,
    wherein the first magnetic layer is farther from the substrate than the second magnetic layer, and
    wherein the second magnetic layer has a saturation magnetization greater than a saturation magnetization of the first magnetic layer.

2. The perpendicular magnetic recording medium of claim 1, wherein the antiferromagnetic layer comprises an IrMn layer.

3. The perpendicular magnetic recording medium of claim 1, wherein each of the first, second, and third magnetic layers include an element or compound selected from the group consisting of Co, NiFe, CoNiFe, CoFe, CoFeB, CoZrNb and CoTaZr.

4. The perpendicular magnetic recording medium of claim 1, wherein each of the first, second, and third magnetic layers has a thickness which is less than or equal to 20 nm.

5. The perpendicular magnetic recording medium of claim 1, wherein the second magnetic layer is thinner than the first magnetic layer.

6. The perpendicular magnetic recording medium of claim 5, wherein the first magnetic layer has a thickness of 10 to 20 nm and the second magnetic layer has a thickness of 5 to 10 nm.

7. The perpendicular magnetic recording medium of claim 1, wherein the non-magnetic layer comprises an Ru layer of thickness of 0.5 to 1.0 nm.

8. The perpendicular magnetic recording medium of claim 1, wherein if the substrate has a disk form, the magnetic anisotropies of the magnetic layers are aligned in a radial direction of the disk.

9. A perpendicular magnetic recording medium comprising:
    a substrate;
    a perpendicular magnetic recording layer disposed on the substrate; and
    a soft magnetic underlayer (SUL) interposed between the substrate and the perpendicular magnetic recording layer, the SUL comprising,
        a first magnetic layer and a second magnetic layer having unidirectional magnetic anisotropies in directions opposite to each other by an exchange bias;
        an antiferromagnetic layer interposed between the first magnetic layer and the second magnetic layer;
        a first non-magnetic layer interposed between the first magnetic layer and the perpendicular magnetic recording layer;
        a third magnetic layer interposed between the first non-magnetic layer and the perpendicular magnetic recording layer and antiferromagnetically bonded to the first magnetic layer by the first non-magnetic layer to have an uniaxial magnetic anisotropy;
        a second non-magnetic layer interposed between the second magnetic layer and the substrate; and
        a fourth magnetic layer interposed between the second non-magnetic layer and the substrate and antiferromagnetically bonded to the second magnetic layer by the second non-magnetic layer to have an uniaxial magnetic anisotropy,
    wherein at least one of the second magnetic layer and the fourth magnetic layer has a saturation magnetization greater than a saturation magnetization of at least one of the first magnetic layer and the third magnetic layer.

10. The perpendicular magnetic recording medium of claim 9, wherein the antiferromagnetic layer comprises an IrMn layer.

11. The perpendicular magnetic recording medium of claim 9, wherein each of the first, second, third and fourth magnetic layers include an element or compound selected from the group consisting of Co, NiFe, CoNiFe, CoFe, CoFeB, CoZrNb and CoTaZr.

12. The perpendicular magnetic recording medium of claim 9, wherein each of the first, second, third, and fourth magnetic layers has a thickness which is less than or equal to 20 nm.

13. The perpendicular magnetic recording medium of claim 9, wherein the second magnetic layer is thinner than at least one of the first magnetic layer and the third magnetic layer.

14. The perpendicular magnetic recording medium of claim 9, wherein the fourth magnetic layer is thinner than at least one of the first magnetic layer and the third magnetic layer.

15. The perpendicular magnetic recording medium of claim 9, wherein each of the first and third magnetic layers has a thickness of 10 to 20 nm.

16. The perpendicular magnetic recording medium of claim 9, wherein each of the second and fourth magnetic layers has a thickness of 5 to 10 nm.

17. The perpendicular magnetic recording medium of claim 9, wherein at least one of the first non-magnetic layer and the second non-magnetic layer comprises an Ru layer of thickness of 0.5 to 1.0 nm.

18. The perpendicular magnetic recording medium of claim 9, wherein if the substrate is in the form of a disk, the magnetic anisotropies of the first, second, third and fourth magnetic layers are aligned in a radial direction of the disk.

* * * * *